L. C. Field,
Hay Press.
N° 49,193. Patented Aug. 1, 1865.
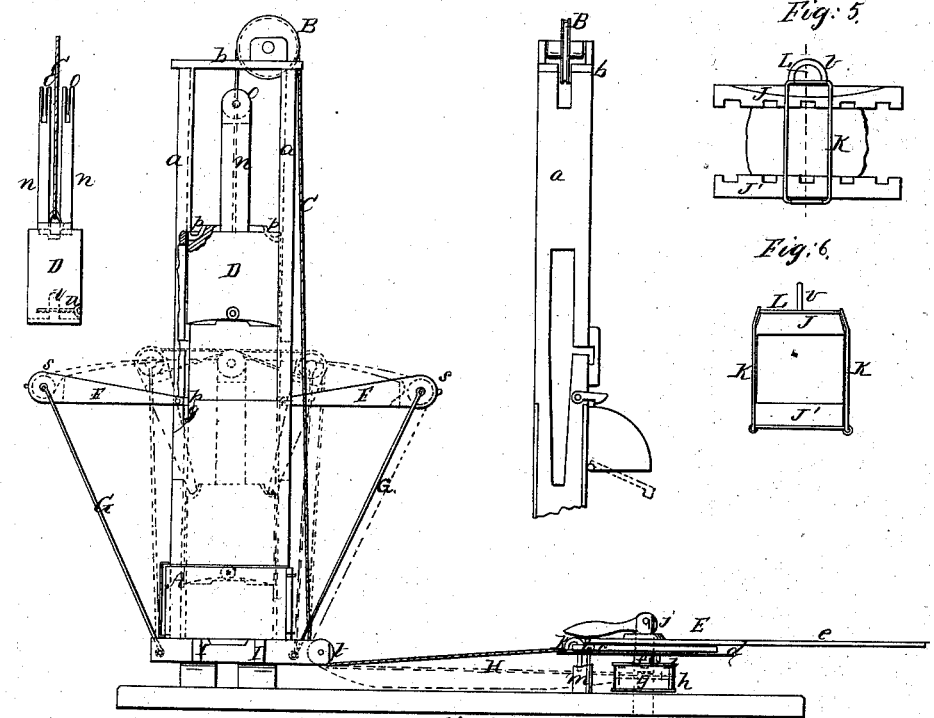

UNITED STATES PATENT OFFICE.

L. C. FIELD, OF GALESBURG, ILLINOIS, ASSIGNOR TO HIMSELF, J. P. FROST, AND W. S. BELLOWS, OF SAME PLACE.

IMPROVEMENT IN BEATER-PRESSES.

Specification forming part of Letters Patent No. 49,193, dated August 1, 1865.

*To all whom it may concern:*

Be it known that I, LOYAL C. FIELD, of Galesburg, county of Knox, and State of Illinois, have invented a new and Improved Beater-Press; and I do hereby declare that the following is a full, clear, and exact description thereof, which will enable others skilled in the art to make and use the same, reference being had to the accompanying drawings, forming part of this specification.

This invention relates to certain improvements in that class of presses in which the article or substance to be compressed and baled or hooped is previously compacted in the press-box by means of a beater which is so arranged as to serve the office of a beater and a follower.

The invention consists in a novel arrangement of levers and a rope, in connection with a suitable windlass arranged with the follower, as hereinafter fully shown and described, whereby a very powerful and compact lever arrangement for operating the follower is obtained.

The invention also consists in an improved windlass, so constructed and arranged that it may, by a very simple manipulation, be made to operate the beater or follower in either capacity—that is to say, when worked as a beater or follower.

The invention further consists in certain means for facilitating the hooping of the bale and its discharge from the press-box, as hereinafter fully set forth.

In the accompanying drawings, Figure 1 is an elevation of my invention; Fig. 2, a plan or top view of the same; Fig. 3, a detached side view of the beater and follower with standards attached; Fig. 4, a side view of a portion of the upper part of the same; Fig. 5, a detached side view of the device for clamping the bale before the hooping of the same; Fig. 6, a transverse section of the same, taken in the line $x$ $x$, Fig. 5; Fig. 7, a detached side view of an inclined plane pertaining to the same.

Similar letters of reference indicate like parts.

A represents a press-box, which may be constructed in the usual manner, and having its sides $a$ $a$ extending upward a considerable distance above the box, and connected by a cross-piece, $b$, a pulley, B, being on the cross-piece, over which a rope, C, passes, one end of which is attached to the follower and beater D and the other end to a ring or strap, $c$, which encompasses a wheel, $d$, of the windlass E. (See Figs. 1 and 2.)

The follower and beater D is allowed to rise and fall freely within the press-box A, and when used as a beater is operated by the rope C, as follows: The wheel $d$ of the windlass has a sweep, $e$, permanently secured to it, the animal being connected to the sweep, and the axis $f$ of the wheel $d$ is tubular and fitted loosely on a fixed rod, $g$, so that the wheel $d$ may be raised and lowered and connected with or detached from a wheel or drum, $h$, underneath $d$, the latter being provided with a pendent pin, $i$, to fit into any of a series of holes in the upper surface of $h$ when $d$ is lowered, and be drawn out free from said holes when $d$ is raised. The wheel $d$ is raised and lowered by means of an eccentric or cam, $j$, on the upper part of the wheel $d$. The wheel $d$ has a pin, $k$, inserted in it, to catch against a projection, $l$, on the ring or strap $c$ and cause the latter to rotate with the wheel $d$ nearly one revolution, an inclined plane, $m$, throwing up the pin $k$ and releasing the ring or strap $c$ at the proper point, so that the beater may descend and act upon the material within the press-box. The pin $k$, when it has passed over the inclined plane $m$, instantly drops, so as to again come in contact with the projection $l$ of the ring or strap $c$ and cause its rotation with the wheel $d$ in order to again raise the beater. Thus the beater is raised and allowed to drop by a continuous rotation of the windlass.

The follower and beater is provided with two standards, $n$ $n$, each of which has a pulley, $o$, in its upper end; and F F are two levers, the inner ends of which are provided with pins $p$ to fit into notches $q$ in the inner sides of the uprights $a$, and also to fit into notches $r$ in the upper part of the beater when the latter is used as a follower. These levers are quite short, and they have their fulcra in the upper ends of oblique rods G, the lower ends of which are attached to the base of the press-box.

In the outer end of each lever F there is a pulley, $s$, and a rope, H, is attached to the outer end of one lever, F, and extends across the upper end of the press-box and around the pulley $s$ in the other lever, and down underneath a pulley, t, at the base of the press-box, and thence to the wheel or drum h, to which it is attached.

When the beater is used as a follower the rope H extends over the pulleys o in the standards n, and the wheel d of the windlass is connected with the wheel or drum h by lowering or letting down wheel d, as previously described, the pin k being withdrawn from d, so that the ring or strap c will not be acted upon. As the wheel or drum h is rotated and the rope wound upon it the inner ends of the levers F F will be passed down upon the follower, the outer ends of the levers being elevated or drawn toward each other, while the rope H, at the commencement of the operation, also bears down on the pulleys o, as shown in red in Fig. 1. By this arrangement a very simple and compact lever arrangement is obtained for operating the follower.

I I represent two ways which are inserted in the lower part of the press-box, and are designed for the ready discharge of the bale therefrom; and J J' are two planks which are grooved transversely, the upper plank, J, being connected by a pin, u, and link v to the bottom of the follower, and the lower plank, J', fitted on the ways I I, the substance to be compressed being between the two, and, when fully compressed by the downward pressure of the follower, fully clamped or retained in its compressed state by means of links K K, which are attached to the lower plank, J', and have their upper ends fitted over the ends of a plate, L, attached transversely to the upper plank, J. By this means the compressed substance may be readily shoved out from the press-box on the ways I I and hooped or bound, after removal from the press-box, so as not to delay the operation of baling.

I claim as new and desire to secure by Letters Patent—

1. The two levers F F, employed, in combination with the rope H, beater D, and notches $q$ and $r$, in the manner and for the purposes set forth.

2. The standards $n\ n$ on the beater D, when used in combination with the levers F F and rope H, for the purpose specified.

3. The windlass E, composed of two drums, $d\ h$, when used, in combination with the eccentric $j$, to operate either the levers or beaters, at the will of the attendant, as described.

4. The ways or track I at the bottom of the press-box, and arranged, substantially as shown, for the discharge of the bale from the press-box.

LOYAL C. FIELD.

Witnesses:
 M. M. LIVINGSTON,
 C. L. TOPLIFF.